United States Patent
Sonoda (10) Patent No.: US 7,130,593 B2
(45) Date of Patent: Oct. 31, 2006

(54) SPACE DIVERSITY RECEIVER, OPERATION CONTROLL METHOD THEREOF, AND PROGRAM

(75) Inventor: Hideaki Sonoda, Minato-ku (JP)

(73) Assignee: NEC Corporation, Tokyo (JP)

( * ) Notice: Subject to any disclaimer, the term of this patent is extended or adjusted under 35 U.S.C. 154(b) by 207 days.

(21) Appl. No.: 10/493,973

(22) PCT Filed: Oct. 30, 2002

(86) PCT No.: PCT/JP02/11273

§ 371 (c)(1),
(2), (4) Date: Apr. 29, 2004

(87) PCT Pub. No.: WO03/039033

PCT Pub. Date: May 8, 2003

(65) Prior Publication Data

US 2005/0014469 A1 Jan. 20, 2005

(30) Foreign Application Priority Data

Oct. 30, 2001 (JP) ............................. 2001-331759

(51) Int. Cl.
*H03C 7/02* (2006.01)
*H04B 1/02* (2006.01)
*H04B 7/02* (2006.01)

(52) U.S. Cl. ..................... 455/101; 455/103; 455/121; 455/129

(58) Field of Classification Search ................ 455/101, 455/102, 121, 129, 103
See application file for complete search history.

(56) References Cited

U.S. PATENT DOCUMENTS 5,203,023 A * 4/1993 Saito et al. .................. 455/133

FOREIGN PATENT DOCUMENTS

| JP | 59-230333 A | 12/1984 |
|----|-------------|---------|
| JP | 60-039942 A | 3/1985 |
| JP | S60-39942 A | 3/1985 |
| JP | 04-357721 A | 12/1992 |
| JP | H06-284056 A | 10/1994 |
| JP | 07-038536 A | 2/1995 |
| JP | 08-125597 A | 5/1996 |
| JP | H08-125597 A | 5/1996 |
| JP | 08-274695 A | 10/1996 |
| JP | H10-322255 A | 12/1998 |

* cited by examiner

*Primary Examiner*—Matthew D. Anderson
*Assistant Examiner*—Tuan Pham
(74) *Attorney, Agent, or Firm*—Sughrue Mion, PLLC (57) ABSTRACT

For combining two received signals (#1, #2) from different reception routes, a control process for maximizing the level of a combined signal (maximum level combining process), a control process for combining the signals in phase with each other (in-phase combining process), a control process for minimizing a waveform distortion of the combined signal (minimum amplitude deviation type combining process), and a control process for performing both the minimum amplitude deviation type combining process and the maximum level combining process are alternatively switched by an EPS (endless phase shifter) control circuit (8) depending on a level detector output (101) and a waveform distortion detector output (102). These control processes are performed by controlling the EPS (1) to control the phase of the received signal (#2). With this arrangement, even in a region where the level remains substantially unchanged by phase rotation of the received signals, stable phase control can be achieved for increased system stability.

9 Claims, 5 Drawing Sheets

SPACE DIVERSITY RECEIVER, OPERATION CONTROL METHOD THEREOF, AND PROGRAM

TECHNICAL FIELD

The present invention relates to a space diversity receiver, and a method and a program for controlling operation of such a space diversity receiver, and more particularly to a space diversity receiver for combining received signals from a plurality of reception routes which are distorted due to the effect of transmission paths in a wireless zone, and a method and a program for controlling operation of such a space diversity receiver.

BACKGROUND ART

Heretofore, diversity receivers of the type described are used to suppress waveform distortions due to fading in transmission paths for providing a good communication environment in microwave digital radio communication systems. One of such diversity receivers is a space diversity receiver for receiving radio signals with a plurality of reception antennas that are spaced at sufficient distances from each other and combining a plurality of minimally correlated received signals from the reception antennas for thereby reducing reception distortions.

There have been proposed various processes of combining a plurality of received signals in such space diversity reception. Particularly, three of those proposed combining processes, i.e., "in-phase combining process", "minimum amplitude deviation type combining process", and "maximum level combining process" are mainly used in the art. The "in-phase combining process" combines received signals from a plurality of reception routes such that the received signals are in phase with each other, and is disclosed in Japanese laid-open patent publication No. 8-274695.

The "minimum amplitude deviation type combining process" detects a notch of a combined received signal and combines received signals so as to minimize an in-band amplitude deviation of the combined received signal depending on the detected notch, is disclosed in Japanese laid-open patent publications Nos. 59-230333 and 7-38536.

The "maximum level combining process" combines received signals such that the combined level thereof will be maximum. According to either one of the above three combining processes, at least one of the received signals is rotated in phase by an endless phase shifter for signal combination. The above three combining processes have both advantages and disadvantages, and are often used in combination. In particular, it is the general practice to use the "minimum amplitude deviation type combining process" and the "maximum level combining process" in combination with each other.

Figure 1:
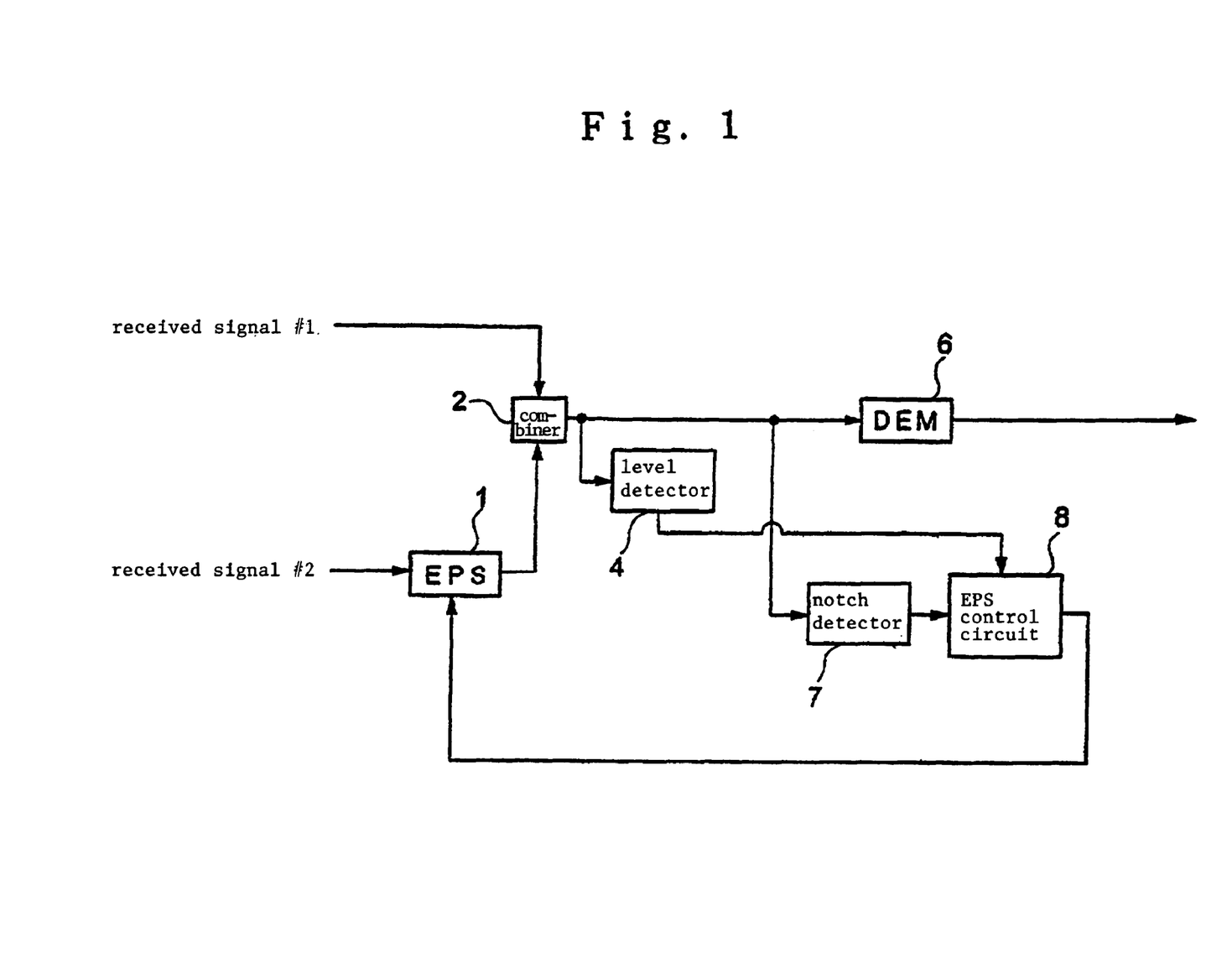
FIG. 1 is a block diagram of a conventional arrangement.

A conventional diversity receiver based on a combination of the "minimum amplitude deviation type combining process" and the "maximum level combining process" will be described below. FIG. 1 of the accompanying drawings shows such a conventional diversity receiver. In FIG. 1, received signals #1, #2 are signals that have been received by respective diversity antennas (not shown) and have their frequencies converted into an intermediate frequency range. EPS (Endless Phase Shifter) 1 is supplied with received signal #2 and an output control signal from EPS control circuit 8, and rotates the phase of received signal #2 through unit steps (degrees) in either direction based on the output control signal, and outputs received signal #2 which has been rotated in phase.

Combiner 2 is supplied with the output signal from EPS 1 and received signal #1, combines these signals, and outputs the combined signal. Level detector 4 is supplied with the combined signal from combiner 2, detects the signal level of the combined signal, and outputs the detected signal level. DEM (Demodulator) 6 is supplied with the combined signal from combiner 2, determines and outputs the sign of the combined signal.

Notch detector 7 is supplied with the combined signal from combiner 2, detects and outputs the depth (distortion) of a notch thereof. EPS control circuit 8 is supplied with the output signal from notch detector 7 and the output signal from level detector 4, generates an optimum control signal from the supplied signals, and outputs the control signal to EPS 1.

Figure 2:
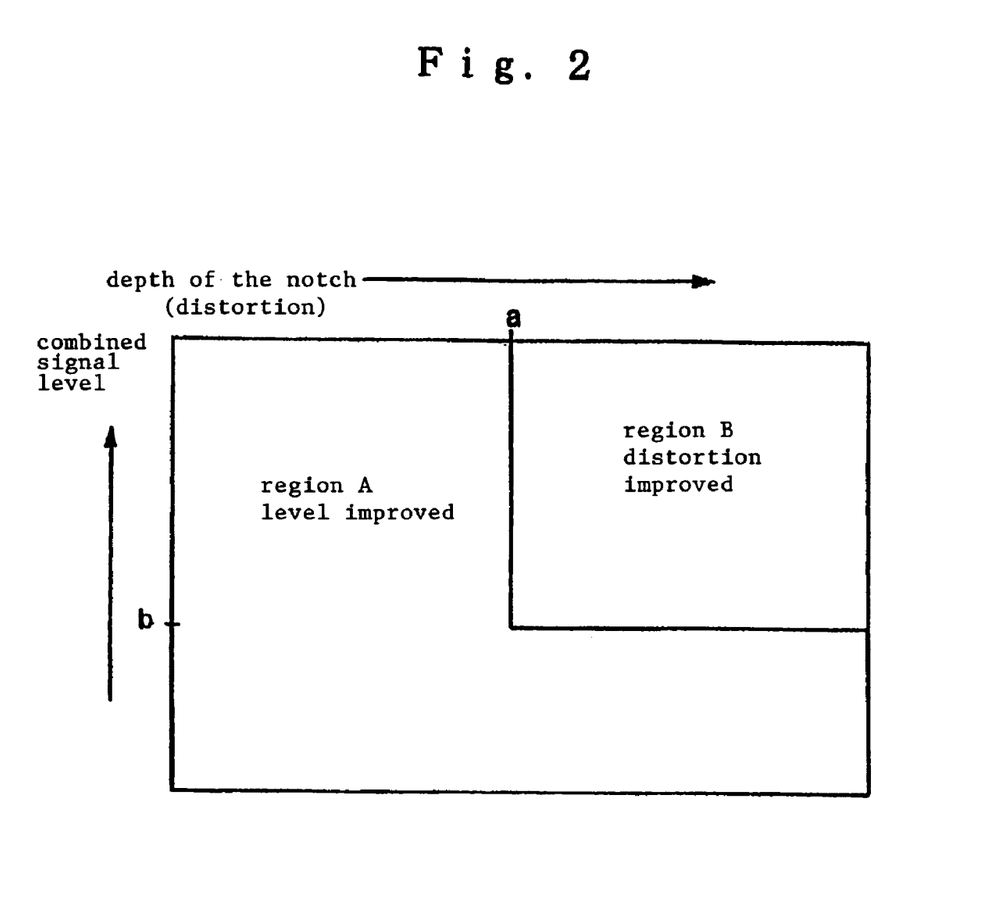
FIG. 2 is a diagram showing a combination control map in the conventional arrangement shown in FIG. 1.

Operation of the conventional diversity receiver shown in FIG. 1 will be described below. FIG. 2 of the accompanying drawings illustrates how to switch between the combining processes. The horizontal axis of FIG. 2 represents the depth of the notch (=the distortion of the waveform), and the vertical axis the combined signal level. The depth of the notch and the combined signal level are greater in the respective directions indicated by the arrows. In FIG. 2, the "maximum level combining process" is performed, i.e., the combined signal level is maximized (level improved), in region A. Specifically, EPS control circuit 8 monitors only the output signal of level detector 4 and applies an output control signal to EPS 1 to rotate the phase of received signal #2 in order to keep the combined signal level maximum.

In region B shown in FIG. 2, the "minimum amplitude deviation type combining process" is performed, i.e., the in-band deviation of the combined signal is minimized (distortion improved). Specifically, EPS control circuit 8 monitors the output signal of notch detector 7 and applies an output control signal to EPS 1 to rotate the phase of received signal #2 in order to minimize the distortion of the waveform. More specifically, notch detector 7 detects levels at a plurality of frequencies in the spectrum of the received signal to detect the magnitude of a change in the amplitude vs. frequency characteristics in the band of the received signal, and EPS control circuit 8 controls EPS 1 to minimize the in-band amplitude vs. frequency deviation.

If it is judged that the combined signal level is high (higher than "b" in FIG. 2) and the distortion is small (smaller than "a" in FIG. 2), then the level improving process is performed. In the distortion improving process, since the in-band deviation is minimized depending on the magnitude of the notch, as described above, main components of the received signals often tend to be combined at angles close to opposite phases, and the amplitude of the combined signal becomes low in level though it is flat. If the distortion is small, then because a reduction in the signal level poses a greater problem as to an error rate than the distortion, region B is not used, but region A is used in preference for a S/N (signal level to noise level) ratio.

If only the distortion becomes greater (greater than "a" in FIG. 2), then control goes to the distortion improving process. If the distortion is large as in region B and the distortion has a greater effect on the error rate than the level, then the distortion improving process is performed as a sufficient distortion improving capability is expected, but the level is lowered. If the level becomes lower than "b" in FIG. 2 at this time, then control goes to the level improving process because the level reduction poses a serious problem though some distortion may remain unremoved (some distortion can be equalized by DFE (Decision Feedback Equalizer) if DFE is provided at a subsequent stage).

The problem of the conventional arrangement is that the phase control based on the EPS is liable to be unstable if the level improving process is performed while the distortion is small and the level is high. This is because the level for use in the control signal is usually detected by a diode and it is highly difficult to detect slight level changes with the diode. The unstable phase control is responsible for a large reduction in the system stability.

DISCLOSURE OF INVENTION

It is a major object of the present invention to provide a space diversity receiver which is capable of suppressing a reduction in system stability to keep good reception quality, and a method and a program for controlling operation of such a space diversity receiver.

According to the present invention, there is provided a space diversity receiver including phase shifting means for shifting the phase of a received signal from a first reception route, level detecting means for detecting the level of a combined signal which comprises an output from the phase shifting means and a received signal from a second reception route, distortion detecting means for detecting a waveform distortion of the combined signal, and control means for controlling the phase shifting means depending on an output from the level detecting means and an output from the distortion detecting means, characterized in that the control means switches alternatively between a control process for maximizing the level of the combined signal (maximum level combining process), a control process for combining the signals in phase with each other (in-phase combining process), and a control process for minimizing the waveform distortion (minimum amplitude deviation type combining process) depending on the output from the level detecting means and the output from the distortion detecting means.

The control means may switch alternatively between the maximum level combining process, the in-phase combining process, the minimum amplitude deviation type combining process, and a control process which performs both the minimum amplitude deviation type combining process and the maximum level combining process, depending on the output from the level detecting means and the output from the distortion detecting means. The control means may perform the maximum level combining process if the output from the level detecting means is smaller than a predetermined value.

The control means may perform the minimum amplitude deviation type combining process if the output from the level detecting means is greater than the predetermined value and the output from the distortion detecting means is greater than a first threshold "b". The control means may perform the control process which performs both the minimum amplitude deviation type combining process and the maximum level combining process if the output from the level detecting means is greater than the predetermined value, the output from the distortion detecting means is smaller than the first threshold "b" and greater than a second threshold "a" ("a"<"b").

The control means may perform the in-phase combining process if the output from the level detecting means is greater than the predetermined value and the output from the distortion detecting means is smaller than the second threshold "a". The space diversity receiver may further comprise phase difference detecting means for detecting a phase difference between the output from the phase shifting means and the received signal from the second reception route, wherein the control means controls the phase shifting means depending on the phase difference when the control means performs the in-phase combining process.

According to the present invention, there is also provided a method of controlling operation of a space diversity receiver including phase shifting means for shifting the phase of a received signal from a first reception route, level detecting means for detecting the level of a combined signal which comprises an output from the phase shifting means and a received signal from a second reception route, and distortion detecting means for detecting a waveform distortion of the combined signal, wherein the phase shifting means is controlled depending on an output from the level detecting means and an output from the distortion detecting means, characterized by the control step of switching alternatively between a control process for maximizing the level of the combined signal (maximum level combining process), a control process for combining the signals in phase with each other (in-phase combining process), and a control process for minimizing the waveform distortion (minimum amplitude deviation type combining process) depending on the output from the level detecting means and the output from the distortion detecting means.

The control step may switch alternatively between the maximum level combining process, the in-phase combining process, the minimum amplitude deviation type combining process, and a control process which performs both the minimum amplitude deviation type combining process and the maximum level combining process, depending on the output from the level detecting means and the output from the distortion detecting means. The control step may perform the maximum level combining process if the output from the level detecting means is smaller than a predetermined value.

The control step may perform the minimum amplitude deviation type combining process if the output from the level detecting means is greater than the predetermined value and the output from the distortion detecting means is greater than a first threshold "b". The control step may perform the control process which performs both the minimum amplitude deviation type combining process and the maximum level combining process if the output from the level detecting means is greater than the predetermined value, the output from the distortion detecting means is smaller than the first threshold "b" and greater than a second threshold "a" ("a"<"b").

The control step may perform the in-phase combining process if the output from the level detecting means is greater than the predetermined value and the output from the distortion detecting means is smaller than the second threshold "a". The method of controlling operation may further comprise the step of detecting a phase difference between the output from the phase shifting means and the received signal from the second reception route, wherein the control step controls the phase shifting means depending on the phase difference when the control step performs the in-phase combining process.

According to the present invention, there is further provided a program for enabling a computer to perform a method of controlling operation of a space diversity receiver including phase shifting means for shifting the phase of a received signal from a first reception route, level detecting means for detecting the level of a combined signal which comprises an output from the phase shifting means and a received signal from a second reception route, and distortion detecting means for detecting a waveform distortion of the combined signal, wherein the phase shifting means is controlled depending on an output from the level detecting means and an output from the distortion detecting means, characterized by the control step of switching alternatively between a control process for maximizing the level of the combined signal (maximum level combining process), a control process for combining the signals in phase with each other (in-phase combining process), and a control process for minimizing the waveform distortion (minimum amplitude deviation type combining process) depending on the output from the level detecting means and the output from the distortion detecting means.

Operation of the present invention will be described below. According to the present invention, the combining processes are switched depending on the detected distortion of the combined signal and the detected level of the combined signal. Specifically, the control process for maximizing the level of the combined signal (maximum level combining process), the control process for combining the signals in phase with each other (in-phase combining process), the control process for minimizing the waveform distortion (minimum amplitude deviation type combining process), and in addition, the control process which performs both the minimum amplitude deviation type combining process and the maximum level combining process, are alternatively switched depending on the output from the level detecting means and the output from the distortion detecting means. With this arrangement, even in a region where the level remains substantially unchanged by phase rotation of the received signals, stable phase control can be achieved for increased system stability.

BEST MODE FOR CARRYING OUT THE INVENTION

Figure 3:
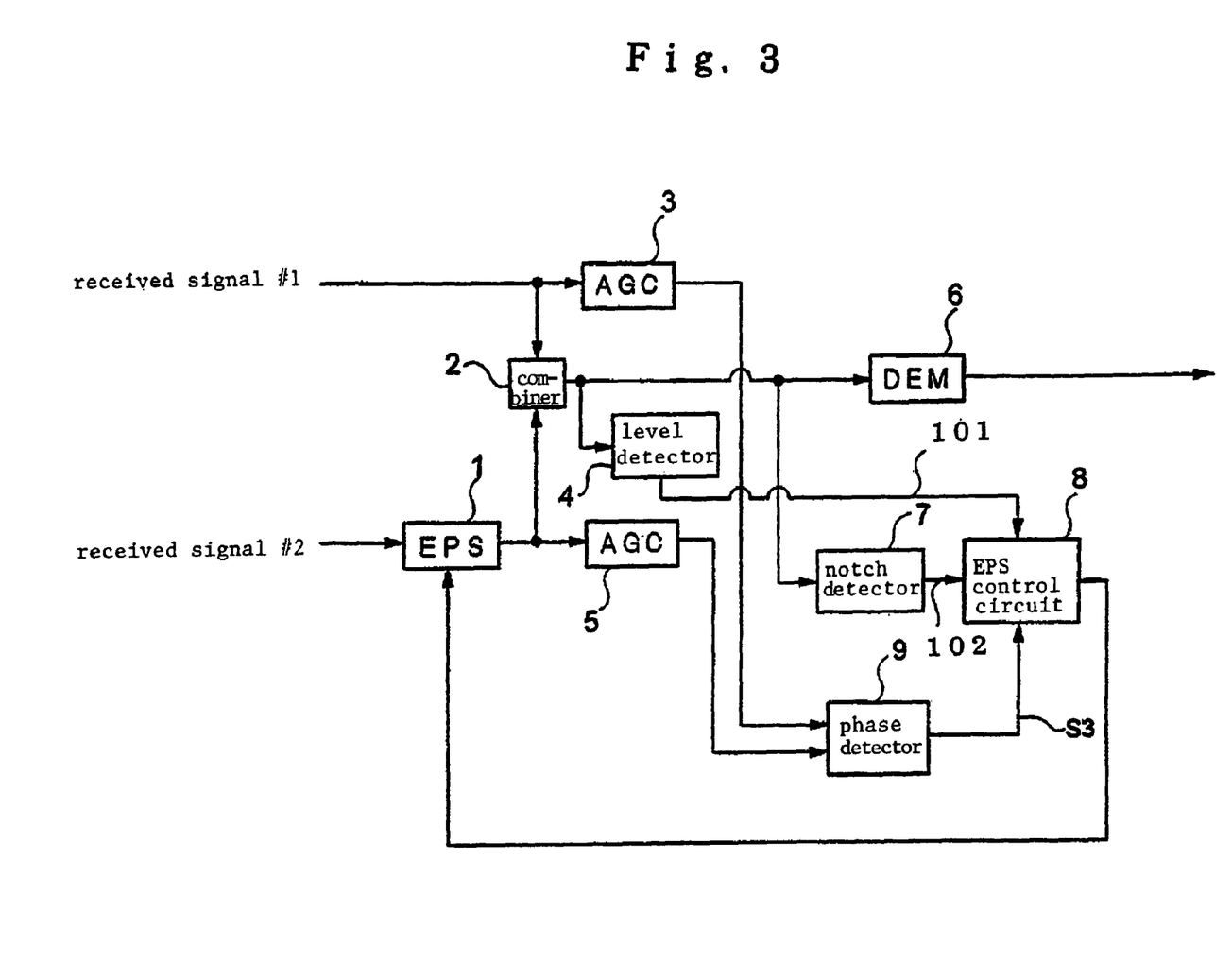
FIG. 3 is a block diagram of an arrangement according to an embodiment of the present invention.

An embodiment of the present invention will be described below with reference to the drawings. FIG. 3 is a block diagram of an arrangement according to the embodiment of the present invention. Those parts shown in FIG. 3 which are equivalent to those shown in FIG. 1 are denoted by identical reference characters. According to the present invention, components described below are added to the arrangement shown in FIG. 1. Those components include AGC (Automatic Gain Control) circuit 3 for amplifying received signal #1 to a predetermined level, AGC signal 5 for amplifying the output signal of EPS 1 to a predetermined level, and phase detector 9 for being supplied with output signals from AGC circuits 3, 5 to detect a phase difference therebetween.

EPS control circuit 8 is supplied with detected phase output S3 from phase detector 9, level detector output 101, and notch detector output 102, and controls EPS 1 based on the supplied three signals. Other structural details of the arrangement shown in FIG. 3 are identical to those shown in FIG. 1, and will not be described below.

Figure 4:
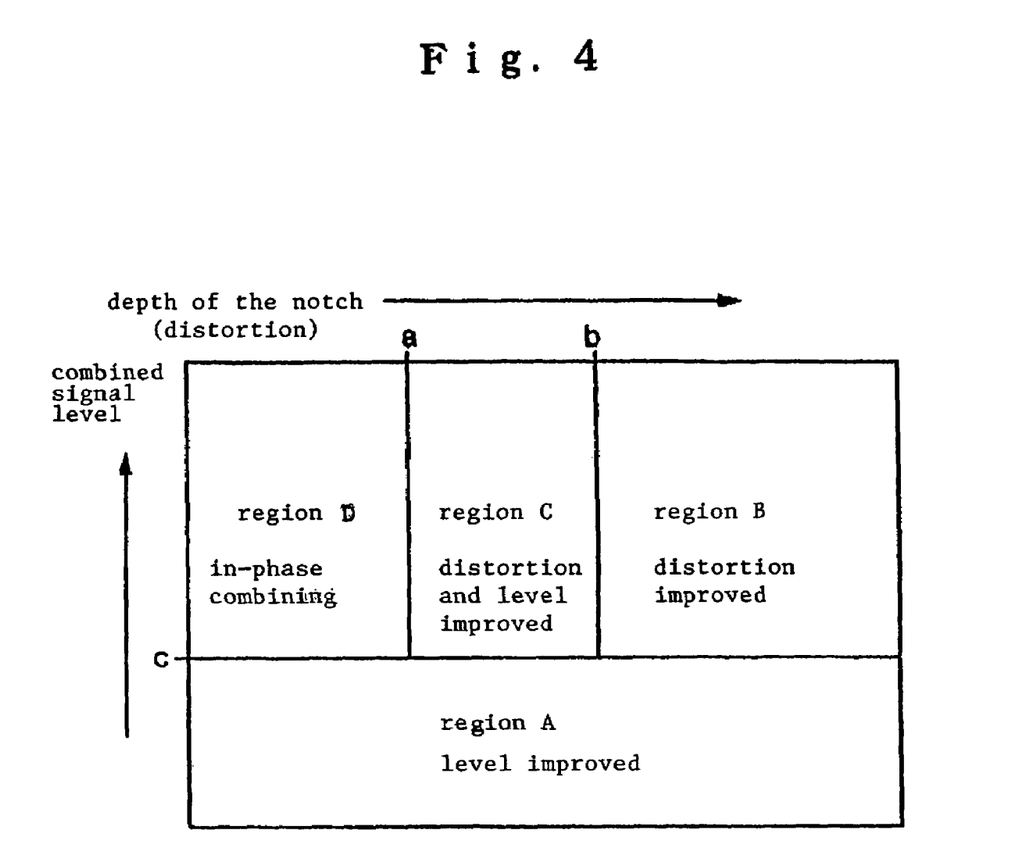
FIG. 4 is a diagram showing a combination control map in the arrangement according to the embodiment of the present invention.

FIG. 4 shows a control map illustrative of a process of switching between combination control algorithms. The horizontal axis of FIG. 4 represents the depth of the notch (=the distortion of the waveform), and the vertical axis the combined signal level. The depth of the notch and the combined signal level are greater in the respective directions indicated by the arrows. In FIG. 4, a control process for improving the level is performed in region A, a control process for improving the distortion is performed in region B, a control process for improving both the distortion and the level is performed in region C, and an in-phase combining process is performed in region D.

Operation of the embodiment of the present invention will be described below with reference to FIGS. 3 and 4. According to the present invention, the "in-phase combining process" is added to the combining processes that are performed according to the conventional arrangement. The "in-phase combining process" is a process of controlling the signals from respective transmission routes in phase with output voltage S3 from phase detector 9 and combining the signals in phase. In order to perform the "in-phase combining process", the arrangement according to the embodiment of the present invention additionally has AGC circuits 3, 5 and phase detector 9 for detecting the phases of the signals from the respective transmission routes, in addition to the conventional arrangement.

Generally, the phase detection performed by a phase detector has a higher detection sensitivity in the vicinity of an in-phase combining angle than the level detection performed by a diode level detector. If a waveform distortion is small and a combined signal level is high, it is possible to perform appropriate phase shift control for higher system stability by carrying out the in-phase combining process (region D) rather than the level improving process (region A). However, the in-phase combining process is not effective to suppress interference waves that are responsible for waveform distortions, as is the case with the level improving process.

As described above, the region where the in-phase combining process is performed is referred to as region D as shown in FIG. 4.

Another difference between the embodiment of the present invention and the conventional arrangement is that region C is defined between region D and region B. In region C, the values of the distortion and the level before and after the phase is rotated by EPS 8 are compared to determine a direction in which to rotate the phase. Specifically, after the phase of received signal #2 is rotated by EPS 8 through a certain angle in a certain direction, the output signal from level detector 4 and the output signals from notch detector 7 before and after the phase is further rotated are referred to. The phase is rotated in the same direction only if improvements in both the level and the distortion are recognized, and is reversed otherwise.

The reasons why region C is included will be described below. For control to shift from region B to region D, the condition of a smaller distortion has to be satisfied. However, the receiver itself is unable to determine whether the distortion became smaller because the status of the transmission paths had been improved or because of the distortion improving effect in region B. Therefore, control tends to shift to region D because of the latter phenomenon. Actually, however, since waveform distortions are present due to the transmission paths, waveform distortions are developed again by a phase rotation from an optimum point in region B to an optimum point in region D, causing control to shift to region B, resulting in a type of oscillatory control action. To solve this problem, the distortion improving process is performed while observing the level. Inasmuch as the level increases as the status of the transmission paths is improved, it is possible to determine whether the distortion becomes smaller because the status of the transmission paths is improved or because of the distortion improving effect in region B, so that the above oscillatory control action can be avoided.

For control to shift from region D to region B, the phase shifting control performed by EPS 8 poses a problem. As described above, the position of a phase close to an opposite phase is stable in region B depending on the distortion. Since the position of a phase tends to become closer to an opposite phase as the distortion is larger, if control shifts to region B from a state where the distortion is large to a certain extent, then a phase difference of nearly 180 degrees is developed with region A where the in-phase combining process is carried out. As a result, the phase shifting control cannot catch up, tending to cause a circuit disconnection in the worst case. Region C is inserted to allow control to shift to the distortion improving process when the distortion is relatively small (at "a" in FIG. 4).

Figure 5:
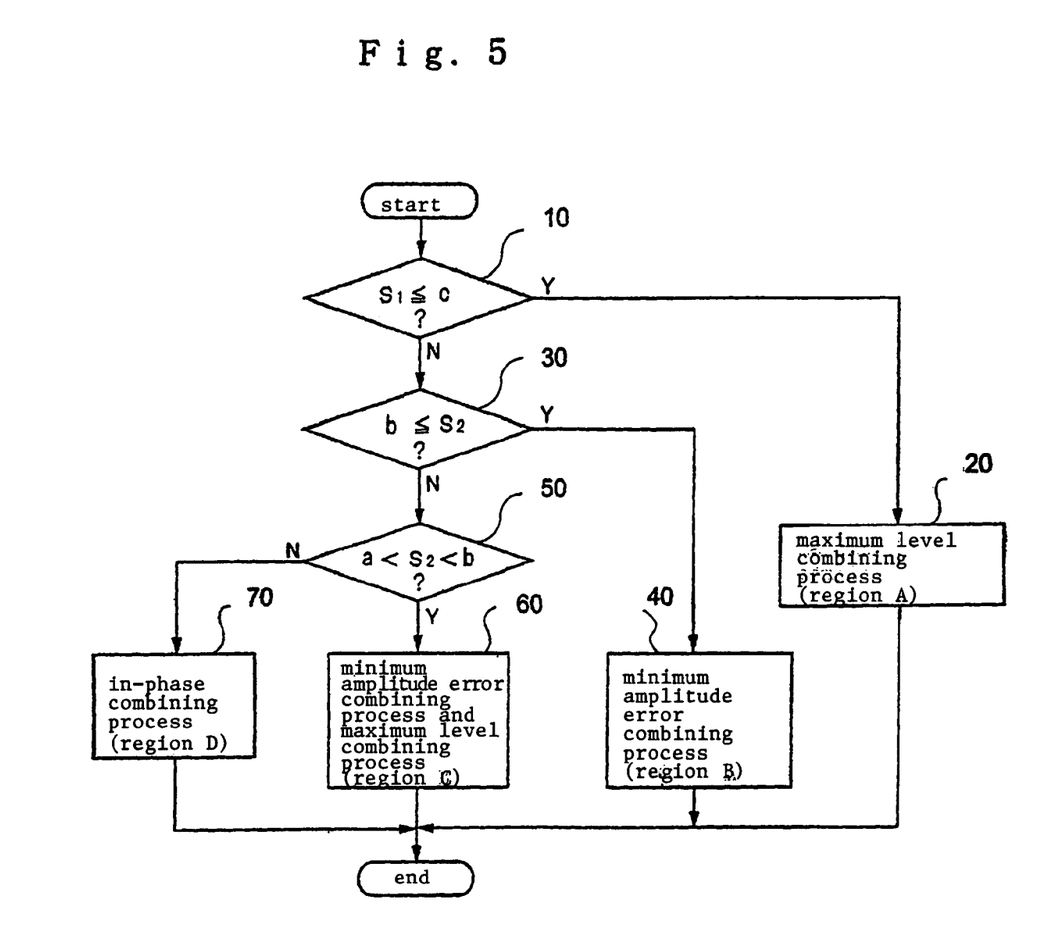
FIG. 5 is a flowchart of an operation sequence of an EPS control circuit shown in FIG. 3.

FIG. 5 shows an operation sequence of EPS control circuit 8 shown in FIG. 3. First, if level detector output 101 is equal to or lower than predetermined value "c" in FIG. 4, then the maximum level combining process (region A shown in FIG. 4) is performed (steps 10, 20). That is, the maximum level combining process is performed to maximize level detector output 101.

If the condition of step 10 is not satisfied, then control goes to step 30 which compares notch detector output 102 with first threshold "b". If notch detector output 102 is greater than first threshold "b", the minimum amplitude deviation type combining process (region B in FIG. 4) is performed (step 40). That is, the minimum amplitude deviation type combining process is performed to minimize the in-band deviation of the combined signal (distortion improved).

If the condition of step 30 is not satisfied, then control goes to step 50 which compares notch detector output 102 with second threshold "a". If notch detector output 102 is greater than second threshold "a" and smaller than first threshold "b", then the combining process (region C in FIG. 4) for performing both the minimum amplitude deviation type combining process and the maximum level combining process is performed (step 60). Otherwise, the in-phase combining process (region D in FIG. 4) is performed (step 70). Specifically, EPS 1 is controlled in order for detected phase output S3 to represent phase difference "0". It is apparent that the flowchart shown in FIG. 3 is a looped sequence (program) for repeatedly carrying out the steps between "START" and "END".

The switching control process shown in FIGS. 4 and 5 may be performed by prestoring the operation sequence shown in FIG. 4 as a program in a recording medium and having a computer (CPU) read and executing the stored program from the recording medium.

The arrangement according to the embodiment of the present invention is advantageous in that the S/N ratio of a combined signal at the time received signals are of a low distortion and a high level can stably be maximized without the need for any special circuits to be added. The reason for such an advantage is that the in-phase combining process is carried out instead of the conventional level improving process for thereby performing phase detection of high accuracy rather than level detection of low accuracy. Thus, even in a region where the level remains substantially unchanged by phase rotation, stable phase control can be achieved for increased system stability.

The invention claimed is:

1. A space diversity receiver comprising:
   phase shifting means for shifting the phase of a received signal from a first reception route;
   level detecting means for detecting the level of a combined signal which comprises an output from said phase shifting means and a received signal from a second reception route;
   distortion detecting means for detecting a waveform distortion of said combined signal; and
   control means for controlling said phase shifting means depending on an output from said level detecting means and an output from said distortion detecting means, wherein
   said control means switches alternatively between a control process for maximizing the level of said combined signal (maximum level combining process), a control process for combining the signals in phase with each other (in-phase combining process), and a control process for minimizing said waveform distortion (minimum amplitude deviation type combining process) depending on the output from said level detecting means and the output from said distortion detecting means, and performs said maximum level combining process if said output from said level detecting means is smaller than a predetermined value,
   wherein said control means performs said minimum amplitude deviation type combining process if said output from said level detecting means is greater than said predetermined value and said output from said distortion detecting means is greater than a first threshold "b", and
   wherein said control means performs a control process which performs both said minimum amplitude deviation type combining process and said maximum level combining process if said output from said level detecting means is greater than said predetermined value, said output from said distortion detecting means is smaller than said first threshold "b" and greater than a second threshold "a", wherein "a" is less than "b".

2. A space diversity receiver according to claim 1, wherein said control means performs said in-phase combining process if said output from said level detecting means is greater than said predetermined value and said output from said distortion detecting means is smaller than said second threshold "a".

3. A space diversity receiver according to claim 2, further comprising:
   phase difference detecting means for detecting a phase difference between the output from said phase shifting means and the received signal from said second reception route;
   wherein said control means controls said phase shifting means depending on said phase difference when said control means performs said in-phase combining process.

4. A method of controlling operation of a space diversity receiver including phase shifting means for shifting the phase of a received signal from a first reception route, level detecting means for detecting the level of a combined signal which comprises an output from said phase shifting means and a received signal from a second reception route, and distortion detecting means for detecting a waveform distortion of said combined signal, wherein said phase shifting means is controlled depending on an output from said level detecting means and an output from said distortion detecting means, the control method comprising:

switching alternatively between a control process for maximizing the level of said combined signal (maximum level combining process), a control process for combining the signals in phase with each other (in-phase combining process), and a control process for minimizing said waveform distortion (minimum amplitude deviation type combining process) depending on the output from said level detecting means and the output from said distortion detecting means, and performing said maximum level combining process if said output from said level detecting means is smaller than a predetermined value, wherein said control step performs said minimum amplitude deviation type combining process if said output from said level detecting means is greater than said predetermined value and said output from said distortion detecting means is greater than a first threshold "b", and wherein said control step performs said control process which performs both said minimum amplitude deviation type combining process and said maximum level combining process if said output from said level detecting means is greater than said predetermined value, said output from said distortion detecting means is smaller than said first threshold "b" and greater than a second threshold "a", wherein "a" is less than "b".

5. A method of controlling operation according to claim 4, wherein said control step performs said in-phase combining process if said output from said level detecting means is greater than said predetermined value and said output from said distortion detecting means is smaller than said second threshold "a".

6. A method of controlling operation according to claim 5, further comprising the step of:

detecting a phase difference between the output from said phase shifting means and the received signal from said second reception route;

wherein said control step controls said phase shifting means depending on said phase difference when said control step performs said in-phase combining process.

7. A program for enabling a computer to perform a method of controlling operation of a space diversity receiver including phase shifting means for shifting the phase of a received signal from a first reception route, level detecting means for detecting the level of a combined signal which comprises an output from said phase shifting means and a received signal from a second reception route, and distortion detecting means for detecting a waveform distortion of said combined signal, wherein said phase shifting means is controlled depending on an output from said level detecting means and an output from said distortion detecting means, comprising the control step of:

switching alternatively between a control process for maximizing the level of said combined signal (maximum level combining process), a control process for combining the signals in phase with each other (in-phase combining process), and a control process for minimizing said waveform distortion (minimum amplitude deviation type combining process) depending on the output from said level detecting means and the output from said distortion detecting means, and performs said maximum level combining process if said output from said level detecting means is smaller than a predetermined value, wherein said control step performs said minimum amplitude deviation type combining process if said output from said level detecting means is greater than said predetermined value and said output from said distortion detecting means is greater than a first threshold "b", and wherein said control step performs said control process which performs both said minimum amplitude deviation type combining process and said maximum level combining process if said output from said level detecting means is greater than said predetermined value, said output from said distortion detecting means is smaller than said first threshold "b" and greater than a second threshold "a" wherein "a" is less than "b".

8. A program according to claim 7, wherein said control step performs said in-phase combining process if said output from said level detecting means is greater than said predetermined value and said output from said distortion detecting means is smaller than said second threshold "a".

9. A program according to claim 8, further comprising the step of:

detecting a phase difference between the output from said phase shifting means and the received signal from said second reception route;

wherein said control step controls said phase shifting means depending on said phase difference when said control step performs said in-phase combining process.

* * * * *